(12) United States Patent
Abersfelder et al.

(10) Patent No.: US 6,690,408 B1
(45) Date of Patent: *Feb. 10, 2004

(54) USE OF A HOLOGRAPHIC VIDEO SCREEN AS A DISPLAY SURFACE FOR INFORMATION SYSTEMS

(75) Inventors: Guenter Abersfelder, Sindelfingen (DE); Helmut Grantz, Sindelfingen (DE); Thorsteinn Halldorsson, Munich (DE); Horst Schmidt-Bischoffshausen, Neubiberg (DE); Stefan Uhl, Stuttgart (DE); Heinrich Alexander Eberl, Probstried (DE)

(73) Assignees: Daimler-Chrysler AG, Stuttgart (DE); Heinrich A. Eberl, Probstried (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,710

(22) Filed: Jul. 17, 1998

(30) Foreign Application Priority Data

Jul. 17, 1997 (DE) .......................................... 197 30 565

(51) Int. Cl.$^7$ .......................... H04N 5/89; G02B 5/32; G02F 1/1335
(52) U.S. Cl. .............................. 348/40; 359/15; 349/61
(58) Field of Search .............................. 348/40, 41, 42, 348/51, 46, 115, 790; 345/7, 87, 22; 349/61, 112, 65; 359/16, 15, 13, 1, 33, 34, 32, 19, 22, 566, 599

(56) References Cited

U.S. PATENT DOCUMENTS

| 3,915,548 | A | * | 10/1975 | Opittek et al. ................. 348/41 |
| 4,500,163 | A | | 2/1985 | Burns et al. |
| 4,582,394 | A | * | 4/1986 | Boyd ............................ 345/22 |
| 5,629,784 | A | * | 5/1997 | Abileah et al. ............. 349/112 |
| 5,659,408 | A | * | 8/1997 | Wenyon ....................... 359/15 |
| 5,675,437 | A | * | 10/1997 | Hart et al. ................... 359/566 |
| 5,680,233 | A | * | 10/1997 | Faris et al. .................... 349/61 |
| 5,870,220 | A | * | 2/1999 | Migdal et al. .............. 359/216 |
| 5,936,751 | A | * | 8/1999 | Wenyon ....................... 359/16 |
| 6,122,079 | A | * | 9/2000 | Branca, Jr. et al. ........... 359/15 |

FOREIGN PATENT DOCUMENTS

| DE | 42 42 797 A1 | 7/1993 |
| DE | 197 00 162 A1 | 7/1998 |
| DE | 197 03 592 A1 | 8/1998 |
| FR | 2 699 289 | 12/1992 |
| JP | 49-24456 | 3/1974 |
| JP | 3-25490 | 2/1991 |
| JP | 5-328336 | 12/1993 |
| JP | 6-208326 | 7/1994 |
| JP | 8-201718 | 8/1996 |
| JP | 8-272328 | 10/1996 |
| WO | WO 90/13062 | 11/1990 |

OTHER PUBLICATIONS

"Surface relief holography for use in display screens" R.L. Shie, C.W. Chau, J.M. Lerner, Physical Optics Corporation, SPIE vol. 2407/177–184.

"Surface relief holography for use in display screens", R.L. Shie, C.W. Chau, J.M. Lerner—SPIE vol. 2407/177–184.

"Accent on Applications", Martha H. Tulloch, Photonics Spectra, Jun. 1995, p. 18.

* cited by examiner

Primary Examiner—Gims Philippe
(74) Attorney, Agent, or Firm—Crowell & Moring LLP

(57) ABSTRACT

A display unit for an information processing system comprises a holographic image generating system. The information processing system may be a computer, television, telephone or other information system. The display may also be used in a large format, including a matrix of individual units, for sports arenas, road signs and the like.

12 Claims, 2 Drawing Sheets

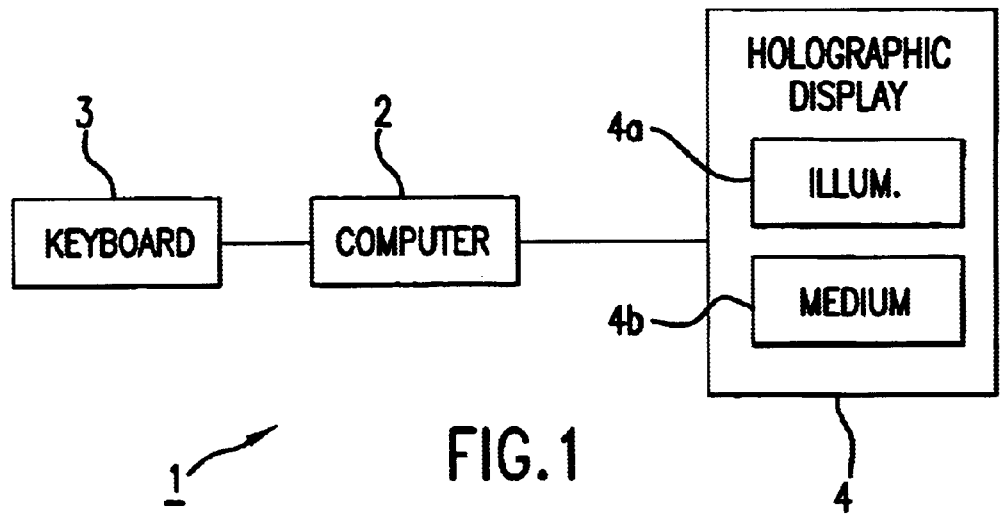
FIG.1
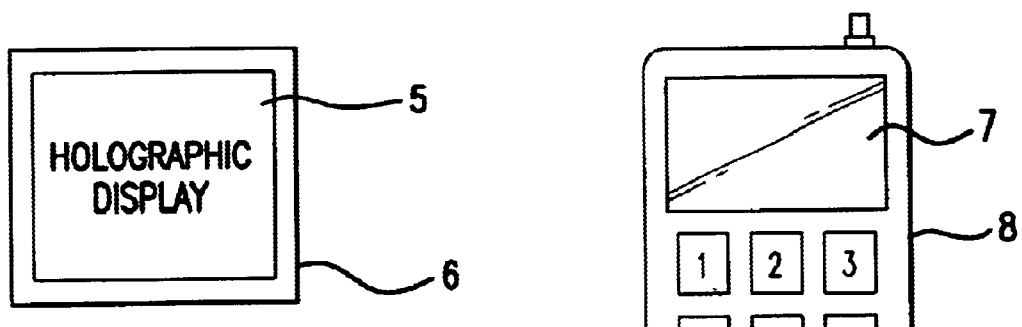
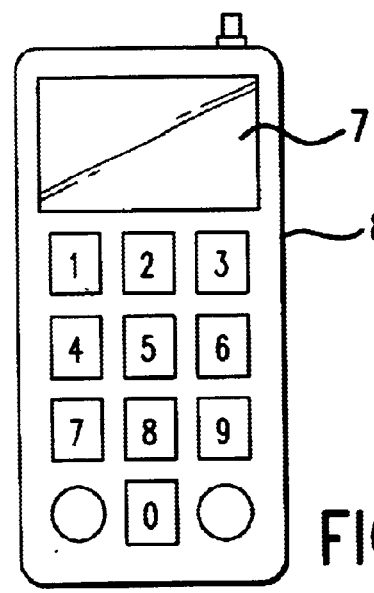
FIG.2
FIG.3
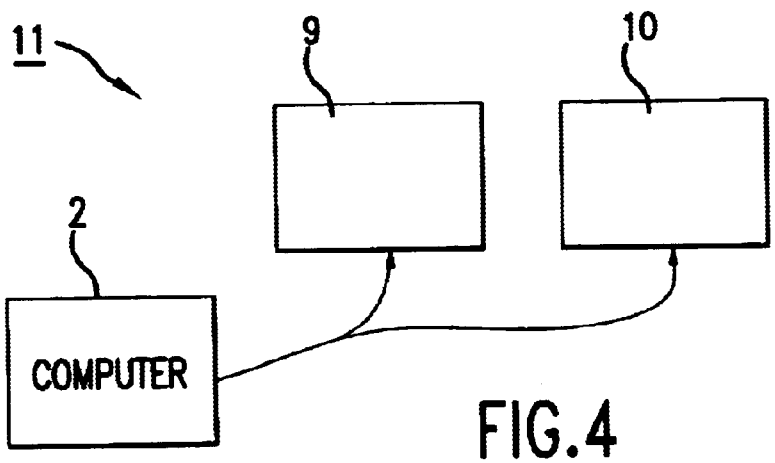
FIG.4

USE OF A HOLOGRAPHIC VIDEO SCREEN AS A DISPLAY SURFACE FOR INFORMATION SYSTEMS

This application claims the priority of German application 197 30 565.2, filed Jul. 17, 1997, the disclosure of which is expressly incorporated by reference herein.

This application is related to co-pending U.S. patent application Ser. No. 09/118,060, filed Jul. 17, 1998 in the name of GUENTER ABERSFELDER et al.

The present invention relates to a display arrangement for a video system. In particular, the invention provides for a holographic video screen, which appears black, gray or colored in ambient light, as a display system for information systems.

Various types of display apparatus and display video screens (displays) are known. For example, it is known to use cathode ray tubes, which require a relatively large amount of energy and space. Furthermore, LCD-displays are also known. Other display possibilities are fixedly mounted and are not easily changed. In addition, display systems are known which use a (preferably white) projection surface to display an image for reasons of good backscatter characteristics. Therefore, to achieve a high contrast, it is necessary to provide an operational environment which is as dark as possible, in order to avoid the backscattering of ambient light and to provide a brilliant display of the image.

German Patent applications 197 00 162.9 and 197 03 592.2, which are not prior publications, disclose a holographic video screen for a laser front projection and a laser rear projection. In normal ambient light, the video screen is black. However, for certain wavelengths of light, this video screen may be constructed such that the light is transmitted and transmitted back within a certain solid angle. In the embodiments disclosed in these two patent applications, the video screen need not have a planar construction; rather, it may have an almost arbitrary surface contour. This arrangement has the advantage that the virtual display of the image can be applied at almost any arbitrary distance.

An object of the present invention is to provide a display arrangement for an information processing system which is compact, energy efficient and easily changed.

Another object of the invention is to provide a display arrangement which can be arranged at a virtually arbitrary spacial position relative to an image provided thereby.

These and other objects and advantages are achieved by the display arrangement according to the invention in which a holographic image is used to provide an output display in an information processing system. The display according to the invention, comprising a holographic device, may appear as black, gray or colored in ambient light; if the video screen appears in color, it is advantageous that it appear in a dark color, to achieve good contrast.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic depiction of a holographic display arrangement according to the invention;

FIG. 2 shows a portable television unit which includes a holographic display;

FIG. 3 shows a portable telephone which has a holographic display unit;

FIG. 4 is a schematic depiction of a pair of eyeglasses which include holographic display units in each of the respective eye pieces;

DETAILED DESCRIPTION OF THE DRAWING

Figures 5, 6:
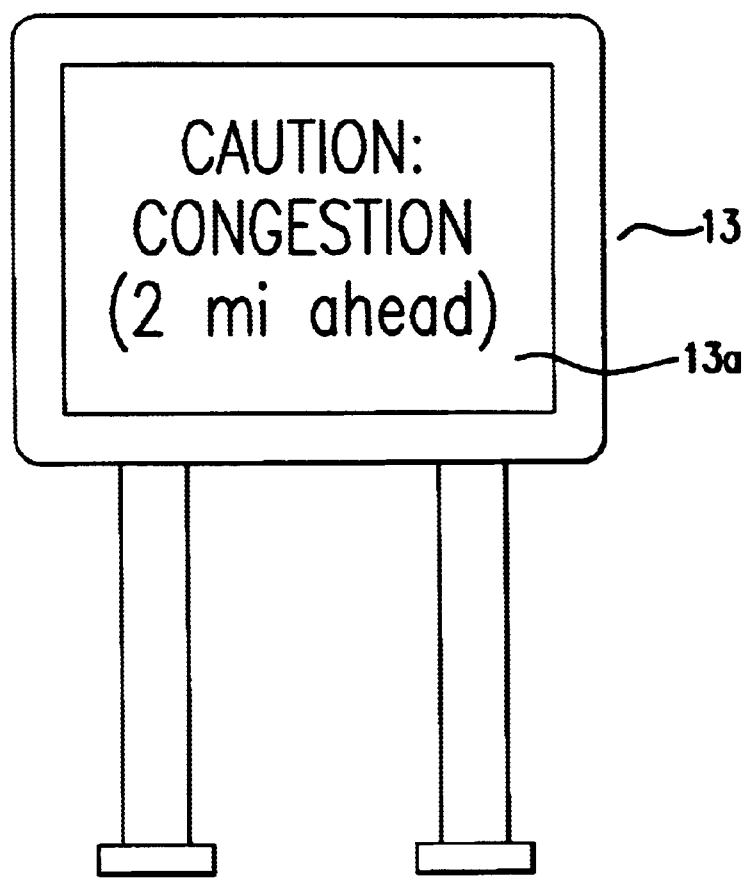
FIG. 5 shows a large display system which incorporates a plurality of smaller holographic image systems arranged in a matrix.
FIG. 6 shows a road sign with a holographic display unit for displaying traffic information.

FIG. 1 is a schematic block diagram that shows an information processing system 1 which incorporates a holographic display according to the invention. Such holographic image generating systems in general are well known to those skilled in the art and require no further explanation. In FIG. 1, the information processing system has a computer or CPU 2 with an input device in the form of a keyboard 3 and a holographic display system 4, which includes an illumination source 4a and a medium or display surface 4b. Image information for the display unit 4 is provided by the computer 2.

By displaying of the image in the form of a virtual video screen at a predefined distance, it is possible to arrange a video screen at a short distance in front of the viewer's eyes, without his or her experiencing focusing or adaptation problems. This arrangement has the advantage, therefore, that it is possible, for example in the case of a holographic video screen with a diagonal of approximately 15 cm, to maintain the same angle of view, while displaying an image impression of a 17-inch PC video screen at a distance of 1 m.

The display according to the invention can also be arranged for a relatively large lecture hall as a relatively large flat video screen, for example, on a wall, with the image display advantageously provided by means of a front projection. Alternatively, the video screen can be embedded in the surface of a desk, which helps to avoid the reduction of contrast caused by bright ambient light.

When the information system is a computer as depicted in FIG. 1, the display surface may be housed in an apparatus which is connected with the computer, such as the keyboard 3 or the housing of the computer. This reduces the space requirements and the costs.

In another embodiment of the invention as shown in FIG. 2, such a holographic video screen 5, which appears black, gray or colored in ambient light, is used as part of a compact television set 6. That is, because that small holographic video screen has a virtual image plane which is displaced correspondingly far toward the rear, and the resultant adaptation of the eyes, a small portable pocket television set can provide the impression of a large image, even if the apparatus is close to the eyes.

As shown in FIG. 3, a holographic video screen 7 according to the invention, which appears black, gray or colored in ambient light, may be used as a part of, particularly, a portable telephone 8.

In another embodiment of the invention, a small video screen with a diagonal of approximately 1 inch is used in a cordless telephone. In this case, the holographic virtual image must appear at a sufficient distance when the cordless phone is in the normal position on the ear.

In yet another embodiment, such a holographic screen, which appears black, gray or colored in ambient light, is used as part of spectacles 11 for displaying three-dimensional images, as shown in FIG. 4. In contrast to the known cyberspace glasses, which are closed, open spectacles can be represented with two small holographic video screens 9, 10 in front of the eyes, provided that the virtual image plane appears at a sufficient distance. This arrangement advantageously increases wearing comfort, and eliminates the need for shielding against the environment. Also, while known cyberspace spectacles require an expensive optical system for viewing the small video screens, this requirement can be eliminated by the front displacement of the holographic video screen.

In yet another embodiment of the invention, a holographic, video screen, which appears black, gray or colored in ambient light such as shown in FIG. 1, is used as a display board for sports fields or sports arenas.

In still another embodiment illustrated in FIG. 5, seamlessly joined individual, relatively small, identical holographic video screens 12a–i, are used to represent an arbitrarily large video screen surface 12. The image display can take place by front projection or by rear projection. Moreover, optionally partial images 12a–i can be projected by means of several projectors on corresponding partial surfaces of the large video screen.

According to further embodiments of the invention, a holographic video screen such as shown in FIG. 1, which is black, gray or colored in ambient light, can be used:

- as a large video screen for information boards for airports, railroad stations and public facilities,
- as a large video screen for daylight projections, and
- as a large video screen for large cinemas or drive-in cinemas.

In still another embodiment, a holographic video screen, which appears black, gray or colored in ambient light, can be used to implement stage images. This is particularly suitable for fast-changing stage sets, in which high-expenditure set changes can be eliminated. By projecting these stage sets using a holographic video screen, variable scenery can be implemented for displaying a stage background, and for a fast change of the stage setting, without any major "pushing of the scenery". This is achieved by means of a simple direct front projection of suitable slides from the stage loft to light and thin movable holographic projection surfaces.

Finally, in another embodiment of the invention, a holographic video screen 13a, which appears black, gray or colored in ambient light, is used as a part of traffic signs, such as turnpike direction signs 13, and traffic light systems, as shown in FIG. 6. As a result, these signs can be recognized better, even in daylight and when subjected to sun radiation. In addition, the informational content of the traffic signs and of the turnpike direction signs can be changed comparatively easily, by means of software.

The holographic video screen, according to the invention may have an exterior surface with an arbitrary shape. Advantageously, the usable video screen surface corresponds to the exterior dimensions of the video screen.

The advantages of the holographic video screen according to the invention include the following:

- No competing reflection of disturbing outside light;
- full contrast performance even in daylight with fewer energy expenditures;
- insensitivity to ambient light;
- the image plane of the video screen is basically independent of the mounting site;
- the video screen surface is freely selectable;
- the projection direction is freely selectable;
- there is directional selectivity;
- the angles of dispersion are adjustable;
- no special demands are made on the mounting site;
- the shape and the format of the video screen surface are freely selectable, and can be displayed without additional production devices;
- several identical video screen holograms can be combined to a larger surface;
- a video screen shape can be changed by a simple cutting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of displaying information, comprising:
   providing an output from an information system to a holographic image generation unit; and
   displaying information contained in said output in the form of a hologram by generating holographic image in a holographic screen;
   wherein a property of a surface of the holographic screen is that it has an intrinsic coloration which is one of black, gray and a dark color in ambient light.

2. The method according to claim 1, wherein the information system is a computer, and the display surface forms part of the computer.

3. The method according to claim 1, wherein the information system is a computer, and the display surface is housed in an apparatus which is connected with the computer.

4. The method according to claim 1, wherein the information system comprises a compact television set.

5. The method according to claim 1, wherein the information system comprises a portable telephone.

6. The method according to claim 1, wherein the holographic image generation unit comprises first and second image generating elements as part of spectacles for displaying three-dimensional images.

7. The method according to claim 1, wherein said image generating unit comprises a large video screen as a display board for one of: sports facilities, airports, railway stations, public facilities, large cinemas, drive-in cinemas, stage sets, and traffic signs.

8. An information processing system comprising:
   an information processor; and
   a holographic image generating system coupled to receive an output from the information processor and to display the same in a visually readable form; wherein,
   said holographic image generating system comprises a holographic screen; and
   a property of a surface of the holographic screen is that it has an intrinsic coloration that is one of black, grey and a dark color in ambient light.

9. An information processing system according to claim 8, wherein the information processor is a computer.

10. An information processing system according to claim 8, wherein the image generation system comprises first and second image generating units as part of spectacles for displaying three dimensional images.

11. An information processing system according to claim 8, wherein the information processor is a portable television unit.

12. An information processing system according to claim 8, wherein the information processor is a portable telephone.

* * * * *